(12) United States Patent
Schnell

(10) Patent No.: US 9,947,070 B2
(45) Date of Patent: Apr. 17, 2018

(54) GPU THAT PASSES PCIE VIA DISPLAYPORT FOR ROUTING TO A USB TYPE-C CONNECTOR

(71) Applicant: Dell Products L.P., Round Rock, TX (US)

(72) Inventor: Arnold Thomas Schnell, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 15/260,076

(22) Filed: Sep. 8, 2016

(65) Prior Publication Data

US 2018/0068412 A1    Mar. 8, 2018

(51) Int. Cl.
G06T 11/60     (2006.01)
G06T 1/20      (2006.01)
G06F 13/42     (2006.01)
G06F 13/40     (2006.01)

(52) U.S. Cl.
CPC ............ G06T 1/20 (2013.01); G06F 13/4068 (2013.01); G06F 13/4282 (2013.01); *G06F 2213/0026* (2013.01); *G06F 2213/0042* (2013.01)

(58) Field of Classification Search
CPC ..... G06T 1/20; G06T 15/005; G06T 2200/16; G06T 2200/28; G06T 2210/52; G06F 3/14; G09G 5/006; G09G 5/363; G09G 2370/022; H04L 67/42; H04N 21/42653; H04N 21/647; H04N 21/238
See application file for complete search history.

(56) References Cited

U.S. PATENT DOCUMENTS

| | | | | |
|---|---|---|---|---|
| 7,274,368 | B1* | 9/2007 | Keslin | G06F 9/5044 345/522 |
| 8,319,781 | B2* | 11/2012 | Westerhoff | G06F 3/14 345/502 |
| 8,412,872 | B1* | 4/2013 | Wagner | G06F 13/4295 710/2 |
| 8,429,678 | B1* | 4/2013 | Parthiban | G06F 13/385 345/545 |
| 2002/0015042 | A1* | 2/2002 | Robotham | G06F 3/14 345/581 |
| 2004/0143802 | A1* | 7/2004 | Bayraktaroglu | G01R 31/318307 716/106 |
| 2006/0282604 | A1* | 12/2006 | Temkine | G09G 5/363 710/314 |
| 2008/0316218 | A1* | 12/2008 | Kilani | G06T 15/005 345/522 |

(Continued)

*Primary Examiner* — Sultana M Zalalee (74) *Attorney, Agent, or Firm* — Kirton McConkie; Brian Tucker (57) ABSTRACT

A GPU can be configured to selectively function as a PCIe switch so that a PCIe link can be formed between the GPU and a remote GPU. The GPU can include a DisplayPort interface that is coupled via a multiplexer to a USB type-C port. When it is desired to implement remote graphics, the GPU can cause the DisplayPort interface to instead function as a PCIe interface between the GPU and the multiplexer. With this PCIe connection, the GPU can forward its PCIe interface with the CPU to the remote GPU via the USB type-C port. In this way, remote graphics can be implemented without using Thunderbolt to tunnel the PCIe interface to the remote GPU.

20 Claims, 11 Drawing Sheets

(56) References Cited

U.S. PATENT DOCUMENTS

| | | | | |
|---|---|---|---|---|
| 2009/0138544 A1* | 5/2009 | Wegenkittl | ............ | G06F 9/5083 709/203 |
| 2011/0134111 A1* | 6/2011 | Stone | .................. | G06F 9/45541 345/419 |
| 2014/0292803 A1* | 10/2014 | Cook | ...................... | G06T 15/00 345/619 |
| 2015/0178032 A1* | 6/2015 | Gantman | ................ | G06T 15/04 345/520 |
| 2015/0179130 A1* | 6/2015 | Smadi | .................... | G09G 5/006 345/520 |

* cited by examiner

GPU THAT PASSES PCIE VIA DISPLAYPORT FOR ROUTING TO A USB TYPE-C CONNECTOR

CROSS-REFERENCE TO RELATED APPLICATIONS

N/A

BACKGROUND

Most mobile computing systems (e.g., laptops and tablets) require a graphics processing unit (GPU) to drive displays. The GPU can either be integrated into the CPU (an "integrated graphics controller") or a separate unit (a "discrete graphics controller"). When the GPU is a discrete graphics controller, the CPU typically communicates with the GPU using the PCIe standard.

Unlike in desktop systems where a graphics card can be easily added or replaced, in mobile systems, the graphics capabilities are decided at the point of purchase and typically cannot be updated. Mobile systems that employ integrated graphics controllers are typically less expensive and suitable for common users (e.g., users that employ their systems to run typical office productivity software). In contrast, for users that play games or use CAD, multimedia creation, or other graphics-intensive software, a sizable discrete graphics controller is typically required for adequate system performance. However, these discrete graphics controllers can be too expensive for many users.

In order to provide mobile systems that are relatively inexpensive, yet capable of providing high performance graphics, a technique known as remote graphics has been developed. Remote graphics refers to a process of delivering a PCIe interface of the mobile system to a remote system with a more powerful GPU to allow the CPU of the mobile system to send graphics commands to the remote GPU for rendering. A common approach for implementing remote graphics employs the Thunderbolt interface. Two different architectures that employ Thunderbolt to implement remote graphics are depicted in FIGS. 1A and 1B.

Figure 1A:
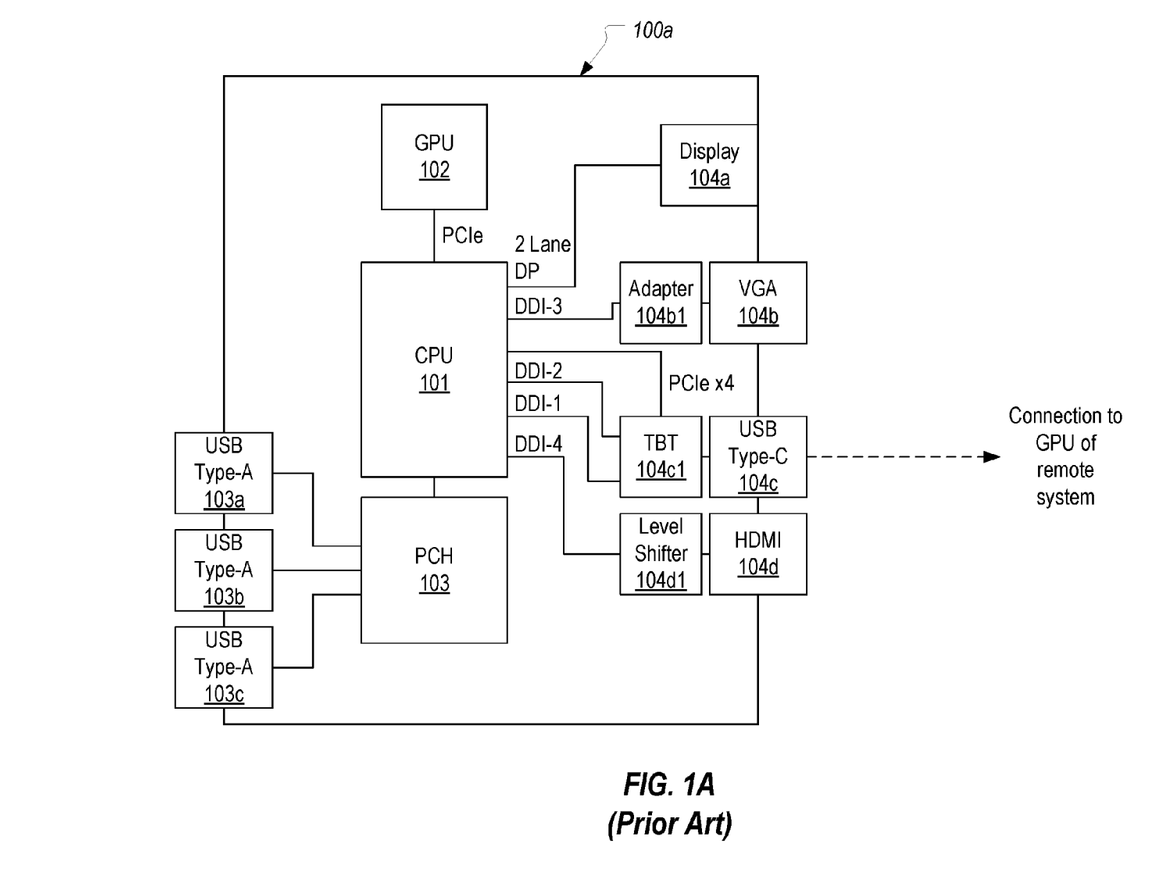
FIGS. 1A and 1B illustrate each illustrate a computing system architecture that would enable remote graphics to be implemented using Thunderbolt.

In FIG. 1A, a computer system 100a includes a CPU 101, a GPU (or discrete graphics controller) 102 that is coupled to CPU 101 via a number of PCIe lanes, and a platform controller hub (PCH) 103 that couples CPU 101 to three USB type-A ports 103a-103c. CPU 101 also has a dedicated 2 lane DisplayPort connection to an integrated display 104a (e.g., the built-in display of a laptop or tablet) and a number of digital display interfaces (DDI-1 through DDI-4). In this example, DDI-1 through DDI-3 comprise DisplayPort lanes while DDI-4 comprises an HDMI channel. It is assumed that computer system 100a includes a VGA port 104b coupled to DDI-3 via a DisplayPort to VGA adapter 104b1, a USB type-C port 104c coupled to DDI-1 and DDI-2 via a Thunderbolt controller 104c1, and an HDMI port 104d coupled to DDI-4 via a level shifter 104d1. Thunderbolt controller 104c1 is also coupled to CPU 101 via four PCIe lanes.

As is known in the art, Thunderbolt can be employed to tunnel DisplayPort and PCIe over USB type-C. Accordingly, with the architecture depicted in FIG. 1A, remote graphics can be implemented via USB type-C port 104c. More specifically, when it is desired to employ a remote GPU to render graphics for display on display 104a (or another connected display), a Thunderbolt cable can be connected between USB type-C port 104c and a Thunderbolt port of the system having the remote GPU to allow graphics commands to be output by CPU 101 to Thunderbolt controller 104c1 and then to the remote GPU via the connected cable. In short, CPU 101, which would typically communicate with GPU 102 via PCIe, can instead be configured to communicate with the remote GPU using PCIe over Thunderbolt.

Figure 1B:
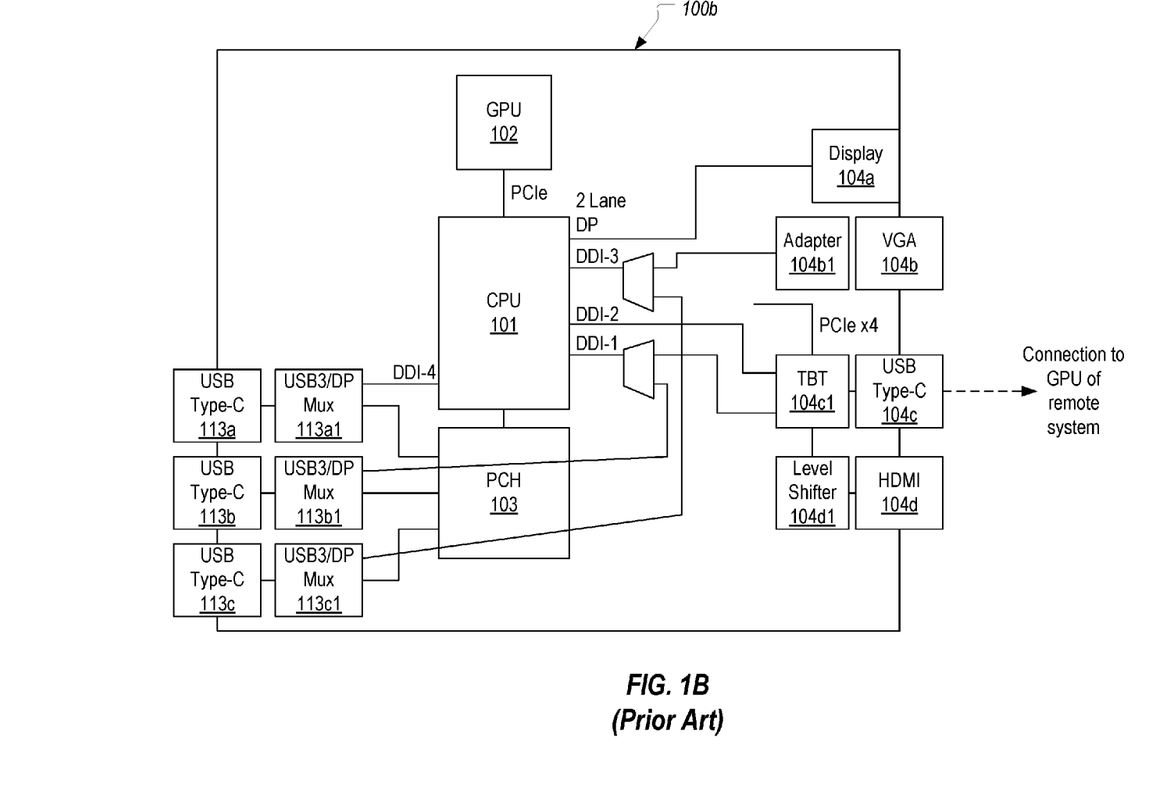

FIG. 1B illustrates a computer system 100b with a similar architecture as computer system 100a except that USB type-A ports 103a-103c have been replaced with USB type-C ports 113a-113c. With this replacement, ports 113a-113c can be employed to connect digital display devices. Accordingly, computer system 100b includes USB3/DisplayPort multiplexers 113a1-113c1 which allow ports 113a-113c to be selectively coupled to DDI-4, DDI-1, and DDI-3 respectively. It is noted that, in this architecture, Thunderbolt controller 104c1 is employed to couple HDMI port 104d to DDI-1 or DDI-2. With the architecture of FIG. 1B, remote graphics can be implemented in the same manner as described above. Specifically, GPU 102 can cause CPU 101 to communicate graphics commands to a remote GPU over PCIe using Thunderbolt controller 104c1.

One problem of employing the architectures of FIGS. 1A and 1B to implement remote graphics is that a Thunderbolt controller is required. The Thunderbolt controller itself is relatively expensive and requires an expensive cable. Therefore, a system capable of implementing remote graphics is oftentimes too expensive for many users that would otherwise benefit from the capability.

BRIEF SUMMARY

The present invention extends to techniques for configuring a GPU to selectively function as a PCIe switch so that a PCIe link can be formed between the GPU and a remote GPU. The GPU can include a DisplayPort interface that is coupled via a multiplexer to a USB type-C port. When it is desired to implement remote graphics, the GPU can use the DisplayPort interface to instead function as a PCIe interface between the GPU and the multiplexer. With this PCIe connection, the GPU can forward its PCIe interface with the CPU to the remote GPU via the USB type-C port. In this way, remote graphics can be implemented without using Thunderbolt to tunnel the PCIe interface to the remote GPU.

In some embodiments, the present invention is implemented as a GPU for use in a computing system. The GPU includes a unidirectional interface for outputting packets containing graphics to an external port of the computing system when a digital display device is connected to the port. The graphics are rendered by the GPU from graphics commands received from a CPU of the computing system. The GPU is configured to selectively convert the unidirectional interface into a bidirectional interface to thereby enable packets containing the graphics commands received from the CPU to be forwarded to the port when a remote GPU is connected to the port.

In other embodiments, the present invention is implemented as a computing system that includes a CPU, a GPU, an external port, and an interface between the GPU and the external port. The GPU is configured to selectively convert the interface between a unidirectional interface by which the GPU outputs graphics to a display device connected to the external port and a bidirectional interface by which the GPU outputs packets containing graphics commands to a remote GPU connected to the external port.

In other embodiments, the present invention is implemented as a method for selectively converting a GPU into a PCIe switch. A DisplayPort interface for outputting graphics to an external port of a computing system is implemented. It is then determined that remote graphics should be implemented. In response, the DisplayPort interface is converted into a PCIe interface. The graphics commands received from a CPU are then forwarded over the PCIe interface such that a remote GPU coupled to the external port receives the graphics commands.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 2:
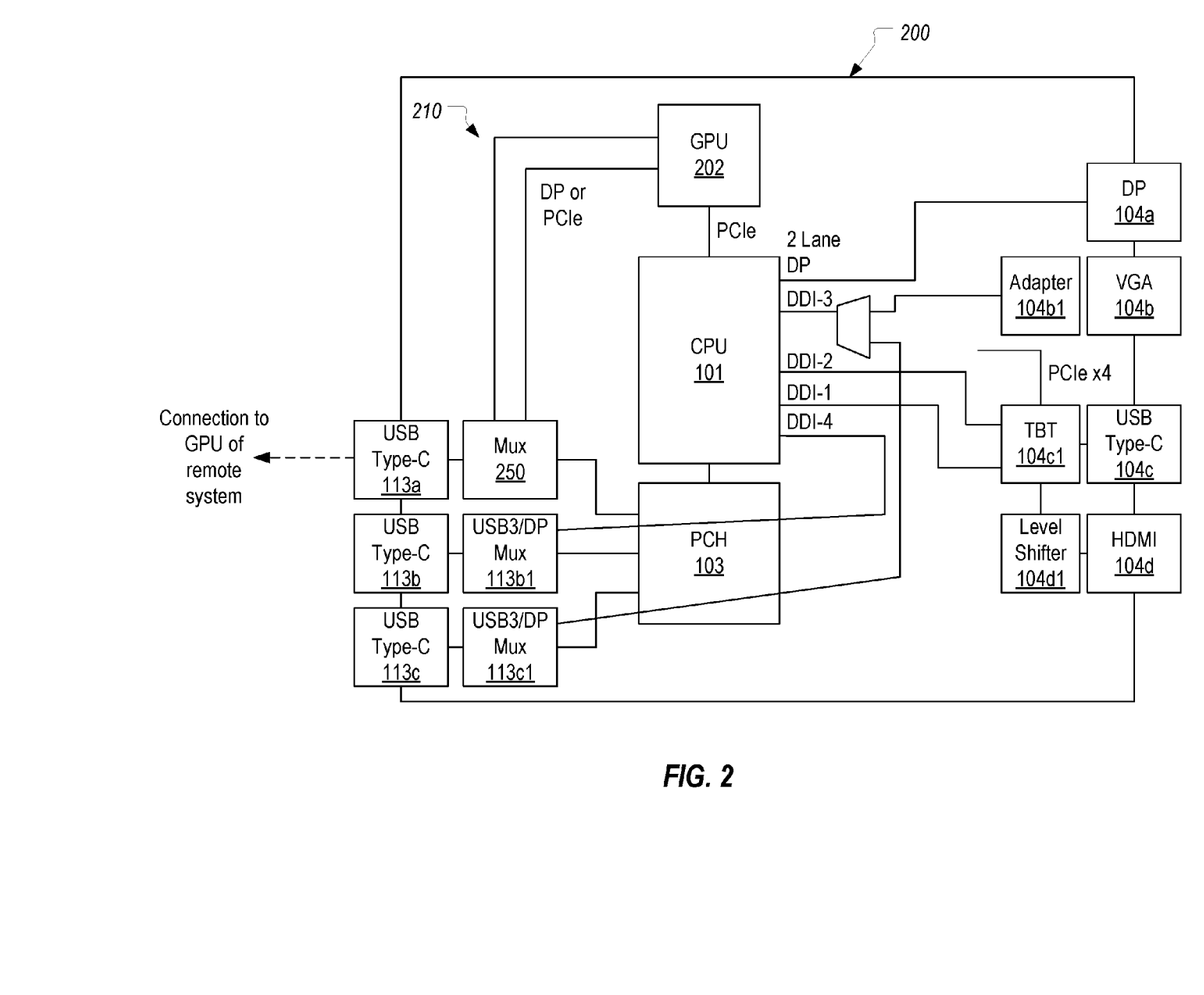
FIG. 2 illustrates a computing system architecture that would enable remote graphics to be implemented without using Thunderbolt by selectively causing the GPU to function as a PCIe switch.
Figure 5:
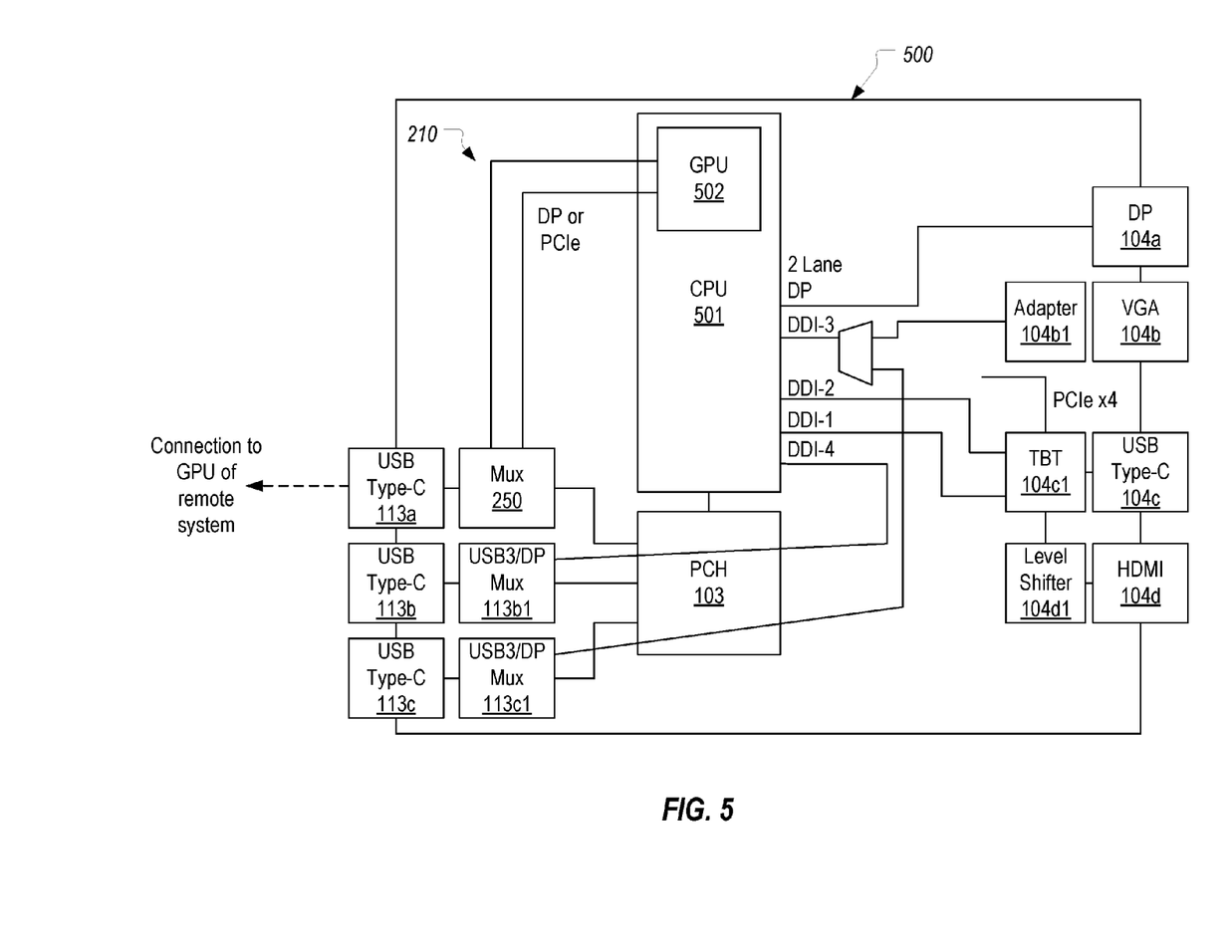
FIG. 5 illustrates how the present invention can be implemented even when the GPU is an integrated graphics controller.

FIG. 2 illustrates a computer system 200 that is configured in accordance with one or more embodiments of the present invention. As shown, the architecture of computer system 200 can have a number of similarities to the architecture of computer system 100b including having similar USB type-C ports 113a-113c and digital display ports 104b-104d along with the corresponding platform controller hub 103 and digital display interfaces 1-4. Unlike with computer system 100b, computer system 200 includes a DisplayPort interface 210 between GPU 202 and multiplexer 250. In some embodiments, DisplayPort interface 210 can comprise eight DisplayPort lanes (i.e., 16 wires) using a technique that will be described in detail below. However, the invention should not be limited to any particular number of lanes. As an initial note, port 113a as depicted in FIGS. 2 and 5 can generally represent one or more physical ports. As will be described in detail below, whether port 113a encompasses one, two, or more physical ports will depend on the number of lanes in DisplayPort interface 210. For ease of illustration, port 113a will be referred to generally until the description of FIGS. 6 and 7 which depict a specific embodiment in which two physical ports are employed.

When operating normally, GPU 202 can render and output graphics for display on one or more display devices coupled to computer system 200. This can include outputting graphics to a display device coupled to USB type-C port 113a. In such cases, GPU 202 would output the graphics in accordance with the DisplayPort standard (i.e., DisplayPort interface 210 would be used to transport DisplayPort packets containing rendered graphics).

In contrast, in accordance with the techniques of the present invention, GPU 202 can be configured to function as a PCIe switch when it is desired to implement remote graphics. In such cases, GPU 202 can cause DisplayPort interface 210 to function as a PCIe interface such that the PCIe interface between CPU 101 and GPU 202 can be forwarded to USB type-C port 113a. In other words, the PCIe packets that would typically be communicated between CPU 101 and GPU 202 will instead be communicated between CPU 101 and the remote GPU without requiring the PCIe packets to be tunneled through Thunderbolt. Computing system 200 can therefore be less expensive than computing systems 100a and 100b while providing the same remote graphics capabilities.

Figure 3A:
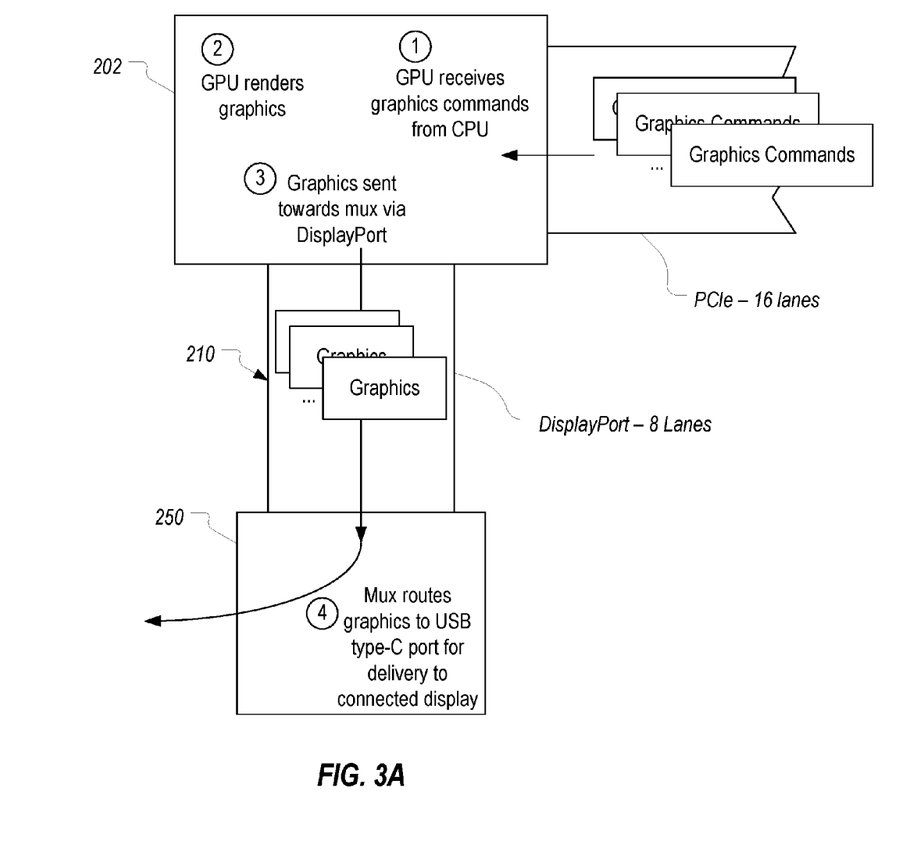
FIG. 3A illustrates how a GPU can implement a DisplayPort interface with a multiplexer to direct graphics to a digital display device connected to a USB type-C port.
Figure 3B:
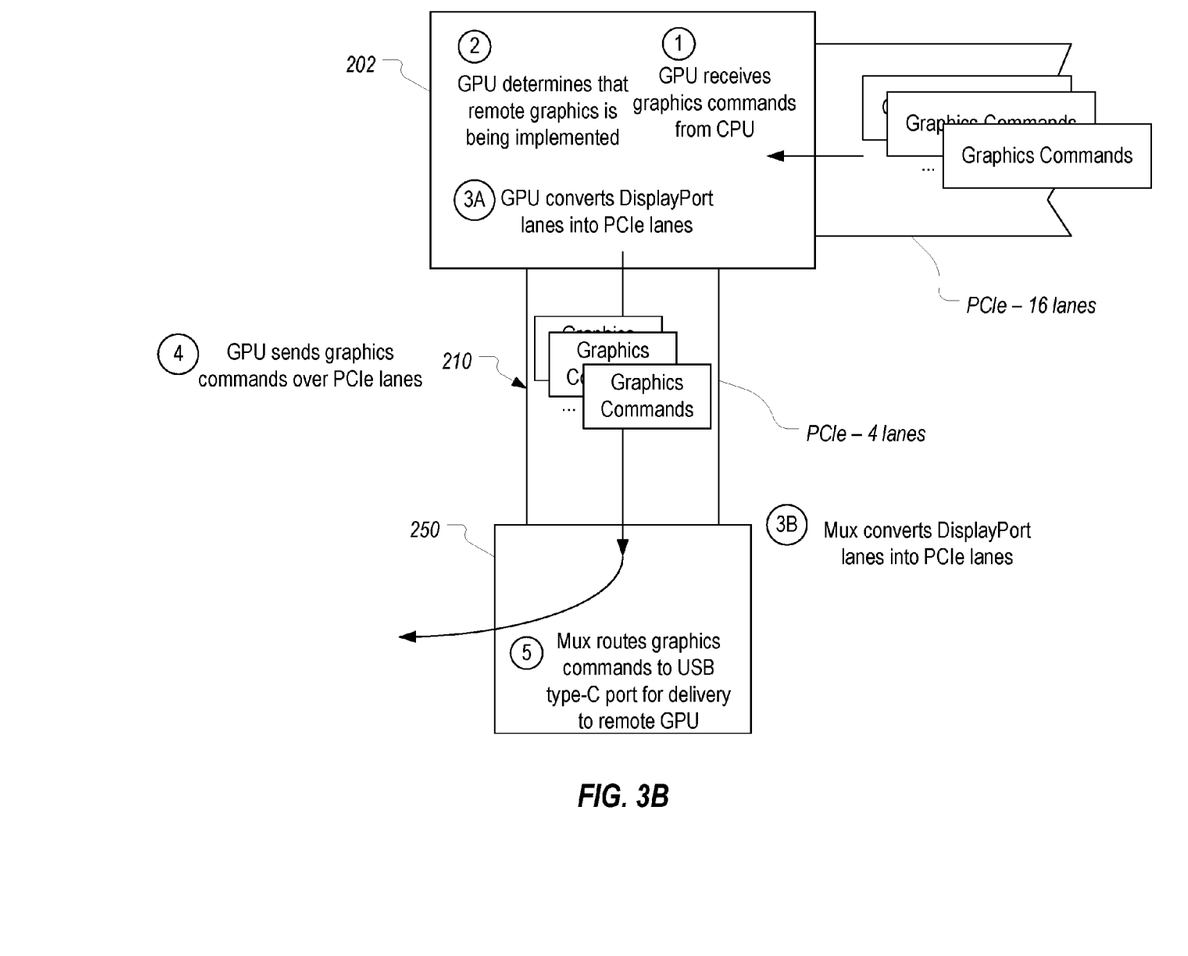
FIG. 3B illustrates how the GPU can convert the DisplayPort interface of FIG. 3A into a PCIe interface to allow the GPU to function as a PCIe switch for forwarding PCIe packets containing graphics commands towards a remote GPU.

FIGS. 3A and 3B generally represent how GPU 202 can operate. In FIG. 3A, it will be assumed that a digital display device is coupled to port 113a, while in FIG. 3B it will be assumed that a remote GPU is coupled to port 113a. Accordingly, FIGS. 3A and 3B represent two different modes of operation of GPU 202. It will also be assumed that a 16 lane PCIe connection exists between GPU 202 and CPU 101 and that DisplayPort interface 210 includes eight lanes (which means that, in this example, port 113a would actually represent two physical USB type-c ports as will be described below).

When a digital display device is coupled to port 113a, GPU 202 can operate in a somewhat typical manner to produce graphics to be output to the connected display. For example, as shown in FIG. 3A as step 1, CPU 101 can provide graphics commands to GPU 202 via the 16 lane PCIe connection. Because remote graphics is not being implemented, in step 2, GPU 202 can render graphics in accordance with the received graphics commands. Then, in step 3, GPU 202 can output the rendered graphics via the eight DisplayPort lanes. Multiplexer 250, based on control signals received from GPU 202 or CPU 101, can be configured to forward the data received over the eight DisplayPort lanes onto the appropriate pins of port 113a. Therefore, in step 4, the graphics will be transferred out through port 113a and to the digital display device.

DisplayPort is a unidirectional interface. Therefore, in the scenario depicted in FIG. 3A, GPU 202 only needs circuitry that is configured to write graphics (or more specifically, DisplayPort packets containing the graphics) onto the DisplayPort lanes. Equally, multiplexer 250 only needs circuitry that is configured to receive the DisplayPort packets containing the graphics in this scenario. Of course, a similar process could be performed when other digital displays are connected to computing system 200 via other ports. In such cases, the graphics rendered by GPU 202 could be routed back through CPU 101 and out through the appropriate display device interface.

Turning to FIG. 3B, when a remote GPU is connected to port 113a (which could be detected by GPU 202 and/or CPU 101), computing system 200 can commence implementing remote graphics. Whether remote graphics is implemented when a remote GPU is available can be a configuration setting or can be dynamically determined based on the type of graphics being produced by software executing on CPU 101. In any case, graphics commands will be generated by CPU 101 and transmitted to GPU 202 via the PCIe interface in step 1. Accordingly, step 1 is substantially the same in both FIGS. 3A and 3B.

In contrast, in step 2 (which is not necessarily performed after step 1), GPU 202 can determine that remote graphics is being implemented. In response, rather than processing the graphics commands received from CPU 101 in a typical fashion, GPU 202 can instead commence functioning as a PCIe switch. This can entail converting DisplayPort interface 210 into a PCIe interface in step 3A. Because PCIe is a bi-directional interface, this conversion can include configuring appropriate circuitry to enable half of the wires in DisplayPort Interface 210 to function as receive pairs. In other words, the circuitry tasked with generating and sending DisplayPort packets over the 16 wires of DisplayPort interface 210 can be configured to instead implement 4 PCIe lanes over these same 16 wires—i.e., to implement four transmit pairs and four receive pairs over which PCIe packets can be transmitted and received.

In conjunction with step 3A, multiplexer 250 can make corresponding changes in step 3B. In particular, the circuitry of multiplexer 250 that is configured to receive DisplayPort packets over DisplayPort Interface 210 can instead be configured to implement four transmit pairs and four receive pairs in accordance with the PCIe standard. To enable this change in functionality, multiplexer 250 can include one or more inputs for receiving a control signal from GPU 202 or CPU 101 which can inform multiplexer 250 when DisplayPort Interface 210 should be converted into a PCIe interface.

With DisplayPort interface 210 being converted into a PCIe interface, in step 4, GPU 202 can commence forwarding the graphics commands to multiplexer 250. Because graphics commands are received in the form of PCIe packets via the 16 lane PCIe interface with CPU 101, GPU 202 can simply forward these PCIe packets onto the four lane PCIe interface with multiplexer 250. Then, in step 5, multiplexer 250 can forward the PCIe packets towards port 113a for delivery to the remote GPU. In this example, and as explained in detail below, multiplexer would implement 2 PCIe lanes with each of two USB type-c ports (i.e., port 113a would represent two physical ports). The PCIe packets would therefore be forwarded over these four total lanes. In contrast, if DisplayPort interface 210 included only 4 DisplayPort lanes/2 PCIe lanes, only a single port would be required. It is therefore again reiterated that port 113a in FIGS. 2 and 5 is intended to represent one or more physical USB type-c ports.

Although not shown in FIG. 3B, the remote GPU would process the graphics commands to render graphics. These graphics would then be returned to GPU 202 via the four lane PCIe interface and ultimately routed to the appropriate display device as if the graphics had been rendered by GPU 202. Notably, the transfer of the graphics commands from GPU 202 to the remote GPU as well as the transfer of the rendered graphics from the remote GPU to GPU 202 can be performed without involving CPU 101 and without employing Thunderbolt. This technique is therefore a lower-cost solution for implementing remote graphics.

Figure 4A:
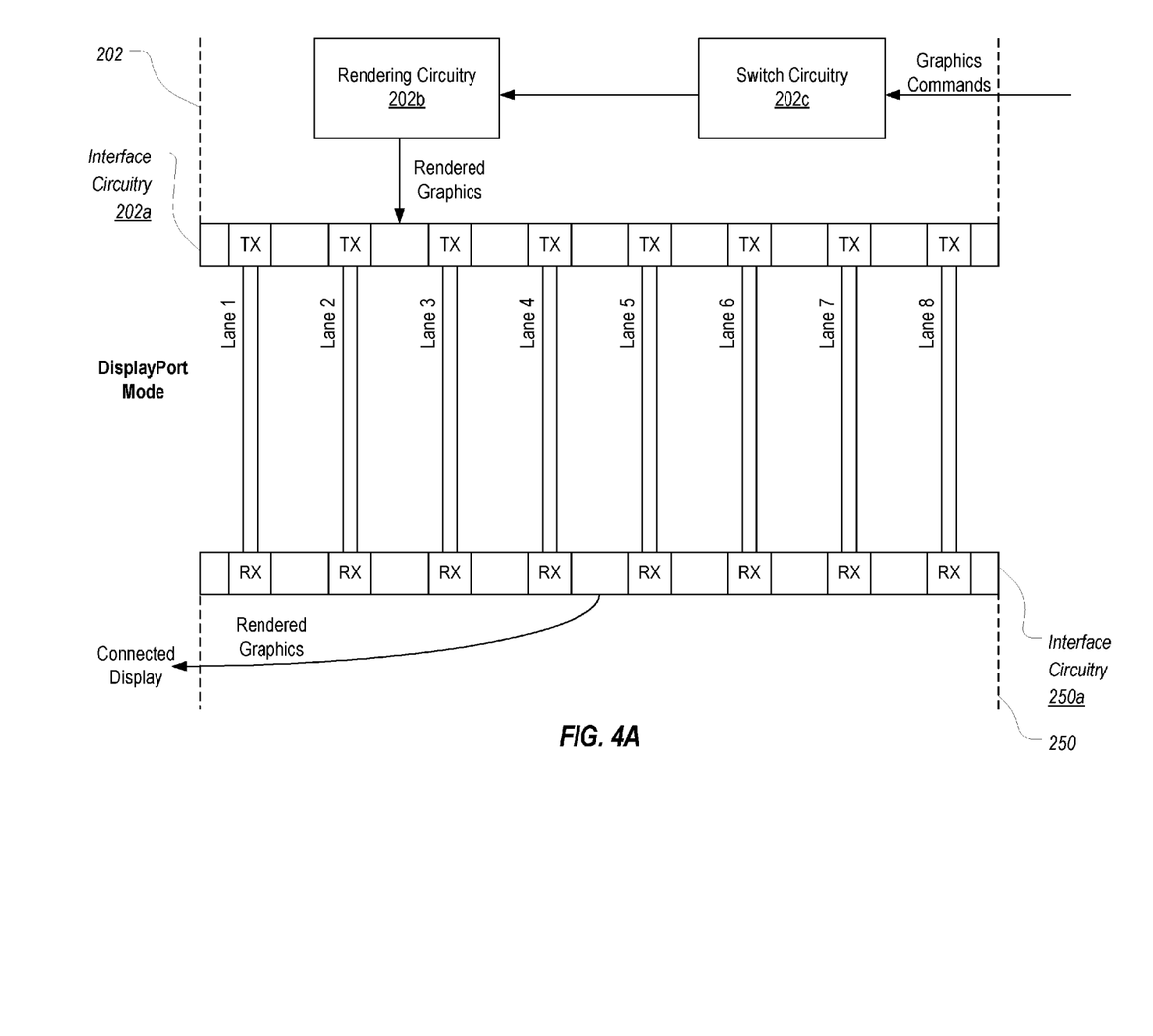
FIG. 4A illustrates how the GPU and multiplexer can include interface circuitry for implementing DisplayPort lanes.
Figure 4B:
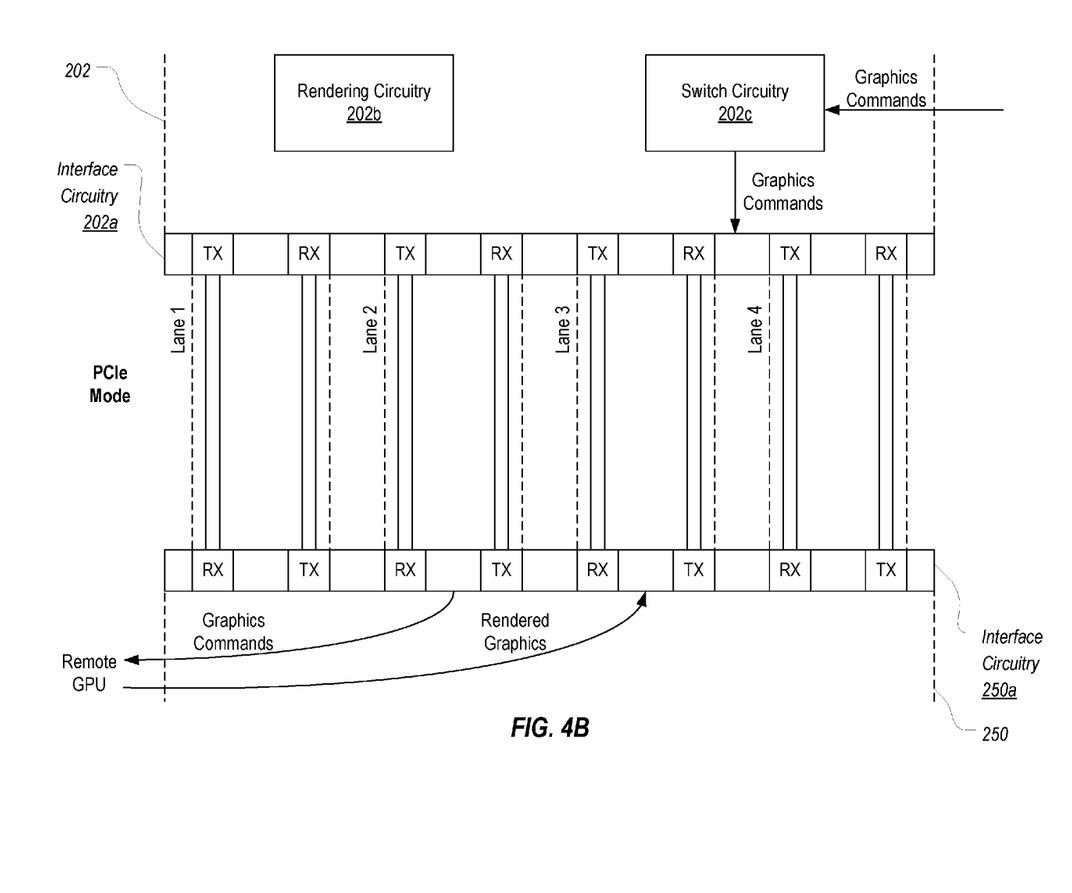
FIG. 4B illustrates how the GPU and multiplexer can configure the interface circuitry to implement PCIe lanes rather than DisplayPort lanes.

FIGS. 4A and 4B, which correspond to FIGS. 3A and 3B respectively, provide a more detailed example of how GPU 202 and multiplexer 250 can switch between a "DisplayPort Mode" and a "PCIe Mode." As shown, GPU 202 can include interface circuitry 202a, rendering circuitry 202b, and switch circuitry 202c, while multiplexer 250 can include interface circuitry 250a. For ease of illustration, this circuitry is generally represented in block format. However, one of skill in the art would understand that there are many different ways to implement this circuitry including using hardware, software, or combinations of both. It is also noted that multiplexer 250 would include multiplexer switching circuitry for controlling the direction of flow of data. However, for ease of illustration, this multiplexer switching circuitry is not shown.

In each of FIGS. 4A and 4B, interface circuitry 202a and 250a represent the interfaces to 16 physical wires between GPU 202 and multiplexer 250. As mentioned above, 16 wires is only one example, and other numbers of wires could be employed (e.g., 8 wires or 32 wires). As interfaces to these physical wires, interface circuitry 202a and 250a can represent the circuitry tasked with transmitting or receiving data packets over these wires. As defined in the relevant standards, one lane in DisplayPort includes a single pair of wires (which are used to transmit), while one lane in PCIe includes two pairs of wires (one for transmitting and one for receiving). As each standard employs differential pairs, the 16 wires are drawn in pairs to facilitate the description of the invention.

Switch circuitry 202c can represent the components of GPU 202 tasked with determining where graphics commands (in the form of PCIe packets) received from CPU 101 should be directed. Rendering circuitry 202b can represent the components of GPU 202 tasked with rendering graphics from graphics commands.

In FIG. 4A, it is assumed that a digital display device is coupled to port 113a, and therefore, GPU 202 and multiplexer 250 can operate in DisplayPort Mode. Either GPU 202 or CPU 101 can detect the presence of the digital display device and can generate one or more control signals to cause each component to operate in this mode. In DisplayPort mode, switch circuitry 202c can be configured to direct graphics commands received from CPU 101 to rendering circuitry 202b thereby causing rendered graphics to be produced. Although not shown, GPU 202 would include circuitry (whether included in rendering circuitry 202b, interface circuitry 202a, or other circuitry) for packetizing the rendered graphics in accordance with the DisplayPort protocol.

Additionally, when in DisplayPort Mode, interface circuitry 202a and interface circuitry 250a can be configured to cause the 16 wires between GPU 202 and multiplexer 250 to function as DisplayPort lanes. As shown, this includes configuring each interface of interface circuitry 202a to function as a transmit interface for sending DisplayPort packets over the eight lanes. Similarly, this includes configuring each interface of interface circuitry 250a to function as a receive interface for receiving the DisplayPort packets from GPU 202. In this way, multiplexer 250 can route the DisplayPort packets containing rendered graphics towards the connected display via USB type-C port 113a. Since DisplayPort is a unidirectional interface, there will be no return data.

Turning now to FIG. 4B, it will be assumed that a remote GPU has been coupled to port 113a. As indicated above, either GPU 202 or CPU 101 can detect the availability of the remote GPU and, in response, can enable PCIe Mode such as by generating one or more control signals. Whether GPU 202 will actually implement remote graphics may ultimately depend on other factors including user input, the type of software that is currently being executed (e.g., when CAD or multimedia creation software is executing), etc.

When in PCIe Mode, GPU 202 will still receive graphics commands in the form of PCIe packets from CPU 101. However, rather than routing the graphics commands to rendering circuitry 202b for local processing, switch circuitry 202c can be configured to forward the packets to interface circuitry 202a. Interface circuitry 202a can also be configured to cause the 16 wires between GPU 202 and multiplexer 250 to implement four PCIe lanes. This can entail converting half of the interfaces of interface circuitry 202a into receive interfaces such that four PCIe lanes that each include a transmit pair and a receive pair are formed. Interface circuitry 250a can also be converted in a corresponding manner. Again, this conversion in the functionality of switch circuitry 202c, interface circuitry 202a, and interface circuitry 250a can be performed in response to one or more control signals that may be generated when a remote GPU is connected to port 113a.

With the four PCIe lanes established between GPU 202 and multiplexer 250, PCIe packets that GPU 202 receives from CPU 101 can be forwarded directly to multiplexer 250 and then output to the remote GPU via port 113a. The remote GPU can process the graphics commands to render graphics which can then be sent back to GPU 202 in PCIe packets over these four PCIe lanes. GPU 202 can then output the graphics to an appropriate digital display in much the same manner as if GPU 202 had rendered the graphics (e.g., by forwarding the PCIe packets containing the graphics to CPU 101 for output over one of the display device interfaces). The conversion of DisplayPort interface 210 into a PCIe interface allows these PCIe packets to be transferred between GPU 202 and the remote GPU without requiring the use of Thunderbolt.

Figure 4C:
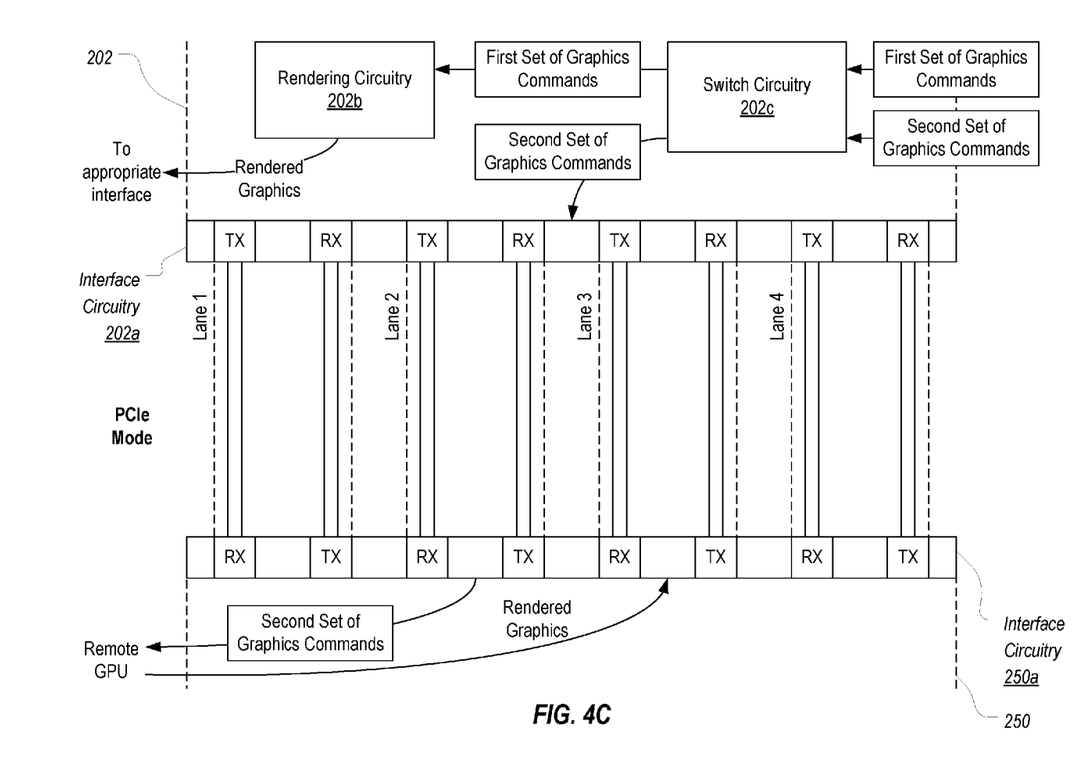
FIG. 4C illustrates an alternate embodiment in which only some of the GPU's interface with the CPU is forwarded over the DisplayPort interface that has been converted to a PCIe interface.

In the previous example, it has been assumed that GPU 202 performs a complete "switch" in that it forwards all lanes of its PCIe interface with CPU 101 to multiplexer 250. However, in some embodiments, GPU 202 may only perform a partial "switch." In particular, GPU 202 may forward a portion of its PCIe interface with CPU 101 to multiplexer 250 while retaining the remaining portion of its PCIe interface for normal interaction. For example, if GPU 202 has a 16 lane PCIe interface with CPU 202, GPU 202 may forward 4 of the 16 lanes to multiplexer 250 while retaining the remaining 12 lanes for normal operation. In such cases, CPU 101 would be able to communicate with and employ GPU 202 in a typical fashion over the 12 PCIe lanes while also communicating with and employing a remote GPU over the 4 forwarded PCIe lanes. For example, CPU 101 can concurrently employ GPU 202 to render graphics for an office productivity application and employ a remote GPU to render graphics for a CAD application.

FIG. 4C generally represents this "partial switch" scenario. As shown, in this scenario, interface circuitry 202a and 250a can be configured to implement a PCIe interface in the same manner described above. However, in contrast to FIG. 4B, GPU 202 can employ switch circuitry 202c to route PCIe packets received over some (e.g., 12) of the lanes of the PCIe interface with CPU 101 (represented as the first set of graphics commands) to rendering circuitry 202b while forwarding PCIe packets received over the remaining (e.g., 4) lanes of the PCI interface with CPU 101 (represented as the second set of graphics commands) towards multiplexer 250. Accordingly, rendering circuitry 202b can still be employed to render graphics commands at the same time as the remote GPU is being employed to render graphics commands. In short, this partial switch scenario would cause CPU 101 to see two GPUs.

To this point, it has been assumed that GPU 202 is a discrete graphics controller. However, the techniques of the present invention can equally be employed when the GPU is an integrated graphics controller as is represented in FIG. 5. As shown, a computing system 500 includes a CPU 501 that provides an integrated graphics controller, GPU 502. The remaining components of computing system are assumed to be the same as in computing system 200.

In these integrated graphics controller embodiments, DisplayPort interface 210 can still exist between GPU 502 and multiplexer 250. Additionally, GPU 502 can be configured to function in the same manner as GPU 202 to selectively convert DisplayPort interface 210 into a PCIe interface as described above. The present invention therefore extends to systems that employ either discrete graphics controllers or integrated graphics controllers.

Figure 6:
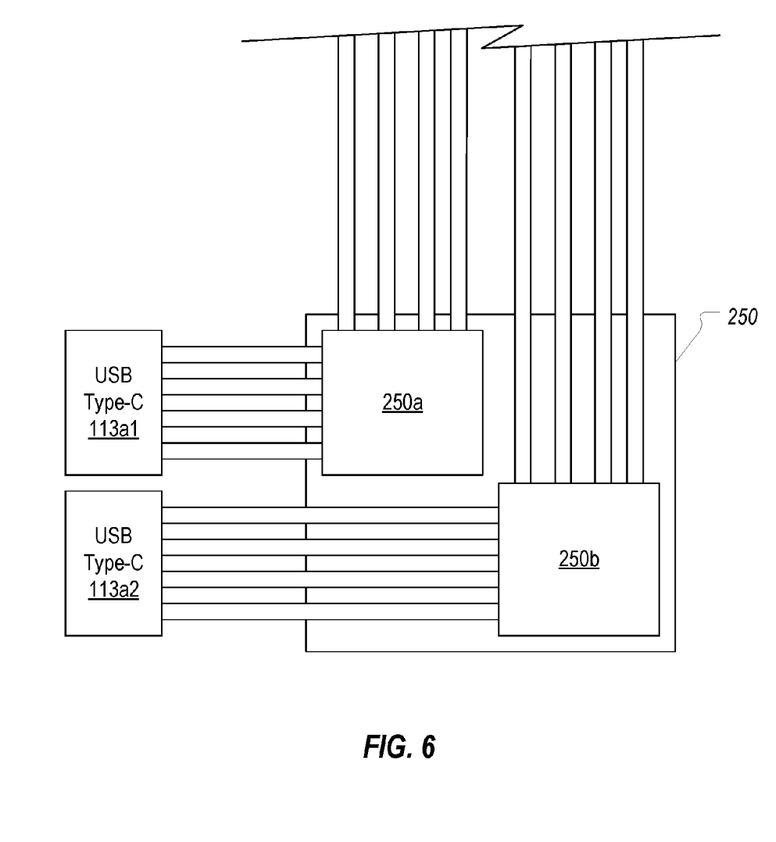
FIG. 6 illustrates an embodiment of a multiplexer in which two multiplexer units are employed to provide eight DisplayPort lanes or four PCIe lanes between the GPU and the multiplexer.

As those of skill in the art understand, the USB type-C connector only provides four differential pairs that can be employed for either DisplayPort or PCIe lanes. Accordingly, in embodiments where an eight lane DisplayPort/four lane PCIe interface is formed between GPU 202/502 and multiplexer 250, it may be desirable to employ more than one USB type-C port to connect GPU 202/502 to the remote GPU. FIG. 6 illustrates an example of how this can be accomplished.

In FIG. 6, multiplexer 250 is shown as including two separate multiplexer units 250a, 250b which are each coupled to eight of the sixteen wires of DisplayPort interface 210. Therefore, each of multiplexer units 250a, 250b can implement four DisplayPort lanes or two PCIe lanes in the manner described above (i.e., by selectively converting some of the differential pairs into transmit pairs when in PCIe Mode). Although it is not believed that a multiplexer currently on the market could function in the manner required by the present invention, the Texas Instruments HD3SS460 4x6 Channels USB Type-C Alternate Mode MUX, if modified to include the ability to selectively convert some of its pins to transmit pins, would be suitable for use as multiplexer unit 250a and 250b. For example, the HD3SS460 includes four differential pairs (LnA-LnD which would correspond to the four vertical sets of differential pairs in FIG. 6) which are currently intended to be used to provide four DisplayPort lanes for a GPU. A modified version of the HD3SS460 could be created in which two of these four differential pairs can be selectively converted (e.g., based on one or more control signals) into transmit pairs to thereby allow the HD3SS460 to provide two PCIe lanes. For clarification, it is noted that in FIG. 6 the four differential pairs extending between the multiplexer units and the ports would correspond to the CTX1, CRX1, CTX2, and CRX2 differential pairs while the SuperSpeed differential pairs and other pins are not shown.

Of course, if a four lane DisplayPort/two lane PCIe interface is provided between GPU 202/502 and multiplexer 250, only a single multiplexer unit and port would be required. Also, if interfaces with a greater number of lanes is desired, the number of ports and multiplexer units can be increased. Further, in some embodiments, a multiplexer capable of providing all lanes of the interface may be employed (i.e., only a single multiplexer unit may be required). Accordingly, the present invention should not be limited to any particular arrangement or architecture of multiplexer 250.

Figure 7:
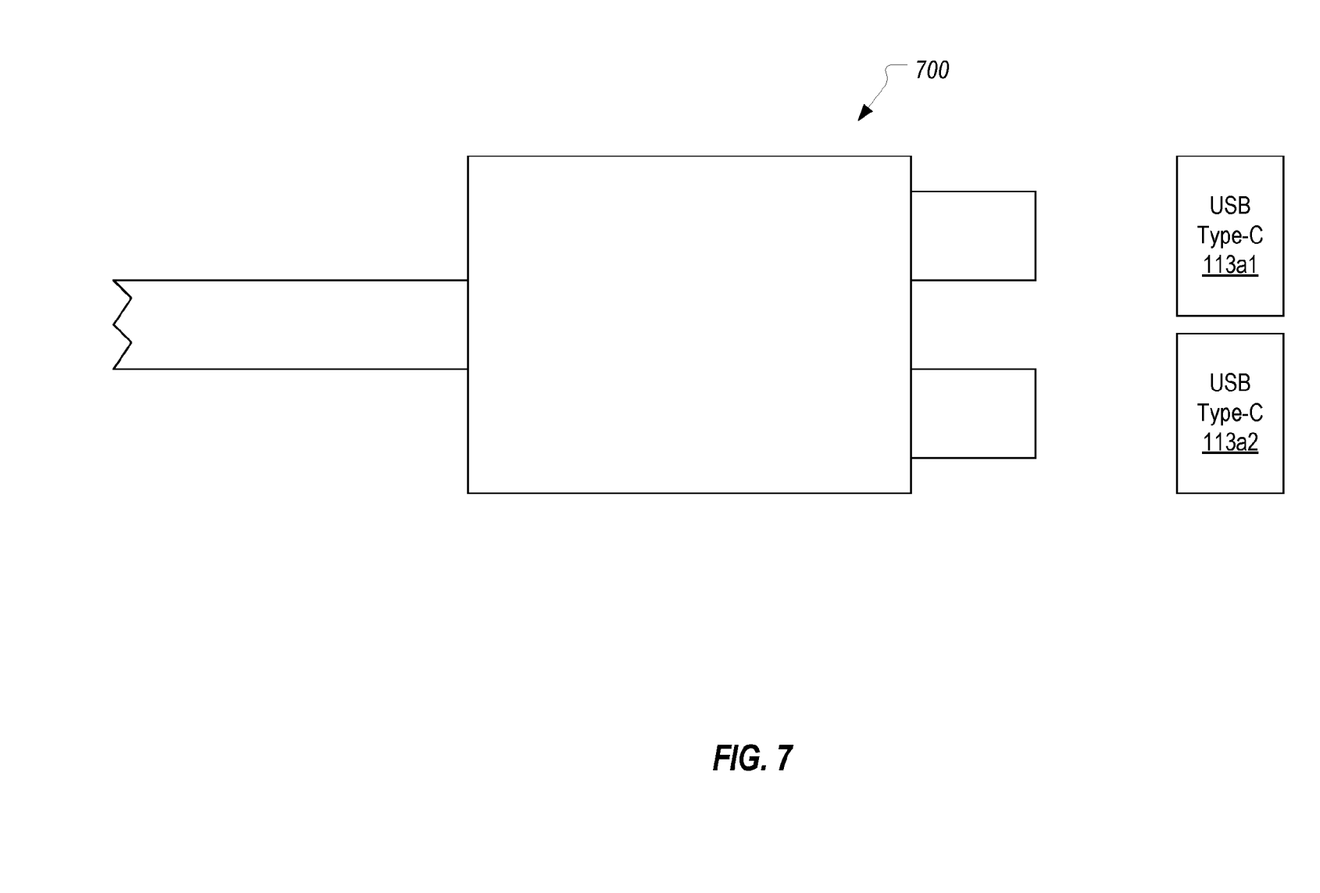
FIG. 7 illustrates an embodiment of a cable that combines two USB type-C connectors together to allow four PCIe lanes to be extended to a remote GPU via two USB type-C ports.

In embodiments where more than one USB type-C port is used for the PCIe interface between GPU 202/502 and the remote GPU, a special cable may also be provided. An example of such a cable is depicted in FIG. 7. As shown, cable 700 physically combines two USB type-C connectors/cables into a single cable. To facilitate use of cable 700, computing system 200/500 can be configured such that ports 113a1, 113a2 are positioned side-by-side with the appropriate spacing as represented in FIG. 7. Although not shown, the other end of cable 700 could be configured in the same manner as the end depicted in FIG. 7 while the computing system housing the remote GPU could also include two side-by-side USB type-C ports. Of course, two separate (i.e., standard) USB type-C cables could instead be employed. However, the use of cable 700 would ensure that all four lanes of PCIe would be established to the remote GPU. To facilitate some variation in the spacing between ports 113a1 and 113a2, cable 700 may be configured to allow the distance between the two connectors to be adjusted (e.g., by providing a flexible connector body that is separated down the middle or by providing two separated connectors that combine into a single cable).

In summary, the present invention provides a technique by which a GPU can selectively function as a PCIe switch to thereby allow remote graphics to be implemented without employing Thunderbolt. In this way, the present invention can allow relatively low cost mobile systems to be produced that still provide high-end graphics capabilities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A GPU for use in a computing system, the GPU comprising:
   a unidirectional interface for outputting packets containing graphics to an external port of the computing system when a digital display device is connected to the port, wherein the graphics are rendered by the GPU from graphics commands received from a CPU of the computing system;
   wherein the GPU is configured to selectively convert the unidirectional interface into a bidirectional interface to thereby enable packets containing the graphics commands received from the CPU to be forwarded to the port when a remote GPU is connected to the port.

2. The GPU of claim 1, wherein the unidirectional interface is a DisplayPort interface.

3. The GPU of claim 1, wherein the bidirectional interface is a PCIe interface.

4. The GPU of claim 1, wherein the port is a USB type-C port.

5. The GPU of claim 1, wherein the port comprises more than one USB type-C port.

6. The GPU of claim 1, wherein the unidirectional interface is an eight lane DisplayPort interface, and the bidirectional interface is a four lane PCIe interface.

7. The GPU of claim 1, wherein the GPU includes interface circuitry for establishing the unidirectional and bidirectional interfaces, and wherein converting the unidirectional interface into the bidirectional interface comprises converting half of the interface circuitry from transmit circuitry into receive circuitry.

8. The GPU of claim 1, wherein the GPU is a discrete graphics controller such that the GPU includes a second bidirectional interface by which the packets containing graphics commands are received from the CPU.

9. The GPU of claim 1, wherein the GPU is an integrated graphics controller.

10. A computing system comprising:
    a CPU;
    a GPU;
    an external port; and
    an interface between the GPU and the external port;
    wherein the GPU is configured to selectively convert the interface between a unidirectional interface by which the GPU outputs graphics to a display device connected to the external port and a bidirectional interface by which the GPU outputs packets containing graphics commands to a remote GPU connected to the external port.

11. The computing system of claim 10, wherein the unidirectional interface is a DisplayPort interface and the bidirectional interface is a PCIe interface.

12. The computing system of claim 10, further comprising:
    a multiplexer positioned between the GPU and the external port, the multiplexer also being configured to selectively convert the interface between the unidirectional interface and the bidirectional interface.

13. The computing system of claim 12, wherein the unidirectional interface is an eight lane DisplayPort interface and the bidirectional interface is a four lane PCIe interface.

14. The computing system of claim 13, wherein the external port comprises two USB type-C ports, each port configured to implement half of the lanes of the DisplayPort and PCIe interfaces.

15. The computing system of claim 14, wherein the multiplexer comprises two multiplexer units, each multiplexer unit implementing half of the lanes of the DisplayPort and PCIe interfaces.

16. The computing system of claim 15, further comprising:
    a single cable having two USB type-C connectors that are configured to couple to the two USB type-C ports.

17. The computing system of claim 10, wherein the GPU is a discrete graphics controller such that the packets containing graphics commands are received from the CPU via a second bidirectional interface and then forwarded onto the bidirectional interface.

18. The computing system of claim 10, wherein the GPU is an integrated graphics controller.

19. A method for selectively converting a GPU into a PCIe switch, the method comprising:
    implementing a DisplayPort interface for outputting graphics to an external port of a computing system;
    determining that remote graphics should be implemented;
    converting the DisplayPort interface into a PCIe interface; and
    forwarding graphics commands received from a CPU over the PCIe interface such that a remote GPU coupled to the external port receives the graphics commands.

20. The method of claim 19, wherein determining that remote graphics should be implemented comprises one or more of:
   detecting that the remote CPU is coupled to the external port; or
   receiving one or more control signals.

\* \* \* \* \*